(12) United States Patent
Shah et al.

(10) Patent No.: US 7,580,406 B2
(45) Date of Patent: Aug. 25, 2009

(54) REMOTE DIRECT MEMORY ACCESS SEGMENT GENERATION BY A NETWORK CONTROLLER

(75) Inventors: Hemal V. Shah, Austin, TX (US); Ashish V. Choubal, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 855 days.

(21) Appl. No.: 11/027,951

(22) Filed: Dec. 31, 2004

(65) Prior Publication Data

US 2006/0146814 A1 Jul. 6, 2006

(51) Int. Cl.
*H04L 12/56* (2006.01)
(52) U.S. Cl. .................................... 370/389
(58) Field of Classification Search .............. 370/229, 370/235, 236, 251, 352, 389, 392, 394, 395.1, 370/395.7, 395.71
See application file for complete search history.

(56) References Cited

U.S. PATENT DOCUMENTS

| | | | |
|---|---|---|---|
| 7,142,540 B2 * | 11/2006 | Hendel et al. | 370/392 |
| 7,295,555 B2 * | 11/2007 | Elzur | 370/394 |
| 2003/0084185 A1 * | 5/2003 | Pinkerton | 709/326 |
| 2005/0080928 A1 | 4/2005 | Beverly et al. | |
| 2005/0141425 A1 * | 6/2005 | Foulds | 370/235 |
| 2005/0144402 A1 | 6/2005 | Beverly | |
| 2005/0216597 A1 | 9/2005 | Shah et al. | |
| 2006/0004795 A1 | 1/2006 | Shah et al. | |
| 2006/0004941 A1 | 1/2006 | Shah et al. | |
| 2006/0004983 A1 | 1/2006 | Tsao et al. | |
| 2006/0133422 A1 * | 6/2006 | Maughan et al. | 370/474 |
| 2006/0136697 A1 | 6/2006 | Tsao et al. | |
| 2006/0146814 A1 | 7/2006 | Shah et al. | |
| 2006/0149919 A1 | 7/2006 | Arizpe et al. | |

* cited by examiner

*Primary Examiner*—Edan Orgad
*Assistant Examiner*—Blanche Wong
(74) *Attorney, Agent, or Firm*—Konrad Raynes & Victor LLP (57) ABSTRACT

A network controller generates a remote direct memory access segment. In one embodiment, the controller generates an RDMA segment including an RDMA header, markers, and message segment data obtained in a direct memory access operation. Other embodiments are described and claimed.

44 Claims, 7 Drawing Sheets

REMOTE DIRECT MEMORY ACCESS SEGMENT GENERATION BY A NETWORK CONTROLLER

BACKGROUND

In a network environment, a network adapter or controller on a host computer, such as an Ethernet controller, Fibre Channel controller, etc., will receive Input/Output (I/O) requests or responses to I/O requests initiated from the host computer. Often, the host computer operating system includes a device driver to communicate with the network controller hardware to manage I/O requests to transmit over a network. The host computer may also utilize a protocol which packages data to be transmitted over the network into packets, each of which contains a destination address as well as a portion of the data to be transmitted. A transport protocol layer can also process the packets received by the network controller and access any I/O commands or data embedded in the packet.

By analogy, a packet is much like an envelope dropped in a mailbox. A packet typically includes "payload" and a "header". The packet's "payload" is analogous to the letter inside the envelope. The packet's "header" is much like the information written on the envelope itself. The header can include information to help network devices handle the packet appropriately.

A computer may employ the TCP/IP (Transmission Control Protocol/Internet Protocol) to encode and address data for transmission, and to decode and access the payload data in the TCP/IP packets received at the network controller. IP specifies the format of packets, also called datagrams, and the addressing scheme. TCP is a higher level protocol which establishes a connection between a destination and a source and provides a byte-stream, reliable, full-duplex transport service. TCP provides applications with simple primitives for establishing a connection (e.g., CONNECT and CLOSE) and transferring data (e.g., SEND and RECEIVE). Behind the scenes, TCP transparently handles a variety of communication issues such as data retransmission, adapting to network traffic congestion, and so forth.

To provide these services, TCP operates on packets known as segments. Generally, a TCP segment travels across a network within ("encapsulated" by) a larger packet such as an Internet Protocol (IP) datagram. The payload of a segment carries a portion of a stream of data sent across a network. A receiver can restore the original stream of data by collecting the received segments. Potentially, segments may not arrive at their destination in their proper order, if at all. For example, different segments may travel very different paths across a network. Thus, TCP assigns a sequence number to each data byte transmitted. This enables a receiver to reassemble the bytes in the correct order. Additionally, since every byte is sequenced, each byte can be acknowledged to confirm successful transmission.

Another protocol, Remote Direct Memory Access (RDMA) on top of TCP provides, among other operations, direct placement of data at a specified memory location at the destination. An RDMA segment may be encapsulated in a TCP segment as the payload of that TCP segment. The RDMA segment has its own RDMA header and payload which includes the RDMA message data. In addition, an RDMA segment may include other information including markers, cyclic redundancy check (CRC) information and pad bytes.

RDMA over TCP/IP protocols include three wire protocols layered above TCP: Marker Protocol Data Unit (PDU) Aligned TCP Framing Protocol (MPA), Direct Data Placement Protocol (DDP); and RDMA Protocol (RDMAP). These protocols support generic memory-to-memory data transfer semantics across a TCP/IP network without intermediate buffering, in some applications. Details on the Marker Protocol Data Unit (PDU) Aligned TCP Framing Protocol (MPA) are described in "Marker PDU Aligned Framing for TCP Specification (Version 1.0)," (October, 2002). Details on the Direct Data Placement Protocol (DDP) are described in the "Direct Data Placement over Reliable Transports (Version 1.0)," (October, 2002). Details on the RDMA Protocol (RDMAP) are described in "An RDMA Protocol Specification (Version 1.0)," (October, 2002).

A device driver, program or operating system can utilize significant host processor resources to handle network transmission requests to the network controller. One technique to reduce the load on the host processor is the use of a TCP/IP Offload Engine (TOE) in which TCP/IP protocol related operations are carried out in the network controller hardware as opposed to the device driver or other host software, thereby saving the host processor from having to perform some or all of the TCP/IP protocol related operations. Similarly, an RDMA-enabled Network Interface Controller (RNIC) offloads RDMA and transport related operations from the host processor(s).

In some known designs, an I/O device such as a network controller or a storage controller may have the capability of directly placing data into an application buffer or other memory area. An RNIC is an example of an I/O device which can perform direct data placement.

An RDMA Verbs Interface (RI) which supports the RNIC Verb Specification (RDMA Protocol Verbs Specification 1.0, April, 2003) can provide a low overhead interface to an RNIC for applications suitable for low latency, high-speed communications. An RDMA Verb is an operation which an RNIC Interface is expected to be able to perform. A Verbs Consumer may use an RNIC Interface to set up communication to other nodes through RDMA Verbs. RDMA Verbs provide RDMA Verb Consumers the capability to control data placement, eliminate data copy operations, and reduce communications overhead and latencies by allowing one Verbs Consumer to directly place information in the memory of another Verbs Consumer, while preserving operating system and memory protection semantics.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description, reference is made to the accompanying drawings which form a part hereof and which illustrate several embodiments of the present disclosure. It is understood that other embodiments may be utilized and structural and operational changes may be made without departing from the scope of the present description.

Figure 1:
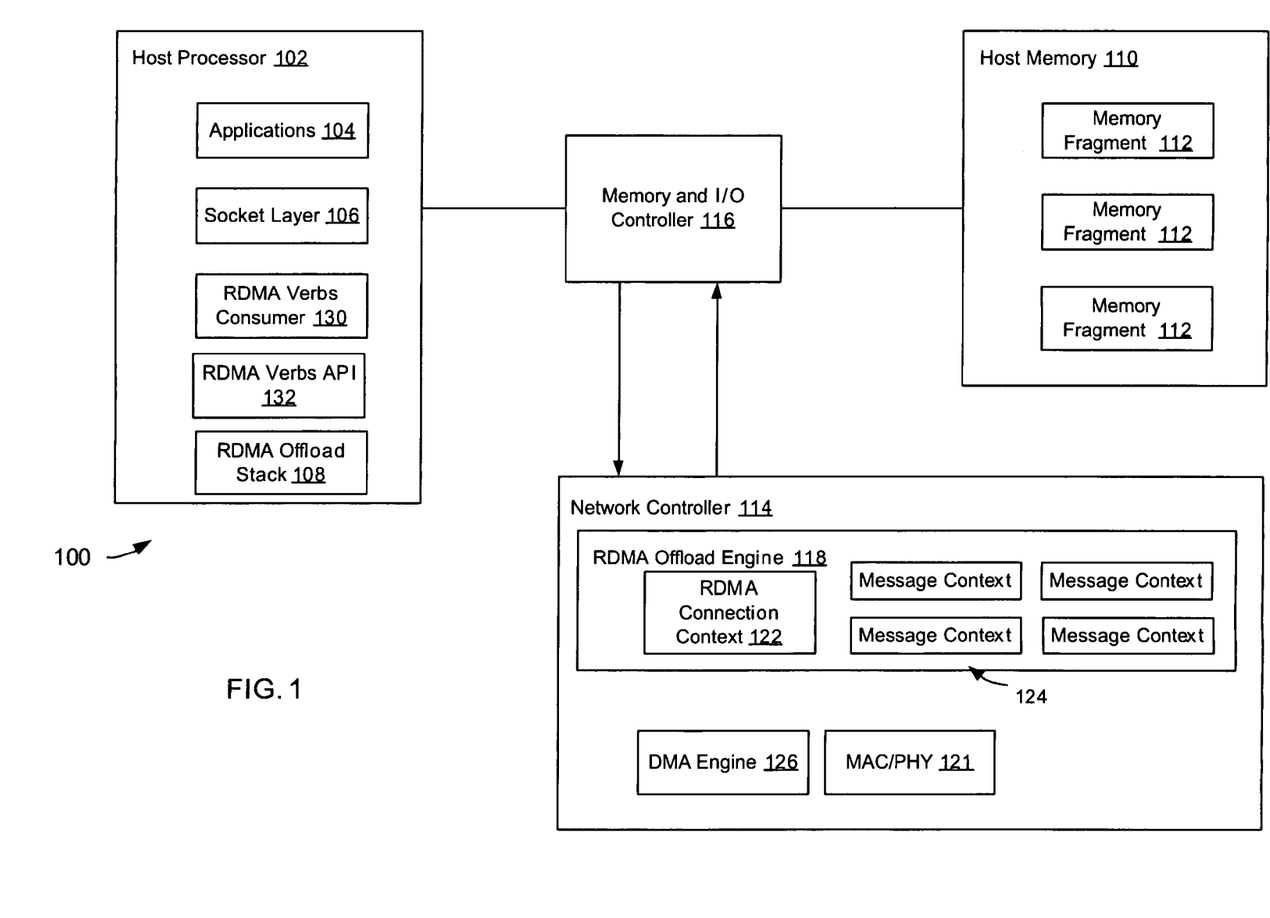
FIG. 1 illustrates a system according to an exemplary embodiment.

FIG. 1 illustrates a computing environment in which aspects of described embodiments may be employed. A system 100 includes a host processor 102 illustrated as having various host elements being processed, e.g., applications 104. The applications 104 may make use of other host elements such as a socket layer 106 or an RDMA Verbs Application Program Interface (API) 132. The host elements interoperate with a host memory 110 that includes, among other things, memory fragments 112 that may be included in the RDMA segment payloads of different packets in packet transmissions.

The packets may be organized to make up, among other things, a TCP segment which includes as its payload, an RDMA segment. An RDMA Network Interface Controller (RNIC) 114 is illustrated communicating with the host processor 102 and host memory 110 during TCP communications.

A memory and I/O (input/output) controller 116 acts as the interface between the host processor 102 and the host memory 110 as well as the interface between the host processor 102 and the RNIC 114. Thus, the memory and I/O controller 116 provides the host processor 102 with the ability to utilize the RNIC 114 operations as they relate to host memory 110 during packet transmissions.

The illustrated embodiment RNIC 114 may transmit the RDMA message data to form an RDMA segment payload directly from host memory 110 without the need for intermediate buffering of the RDMA segment payload by the RNIC 114, thus reducing or eliminating overheads associated with a store-and-forward stage in the RDMA over TCP transmission path in an RNIC 114.

Figure 2:
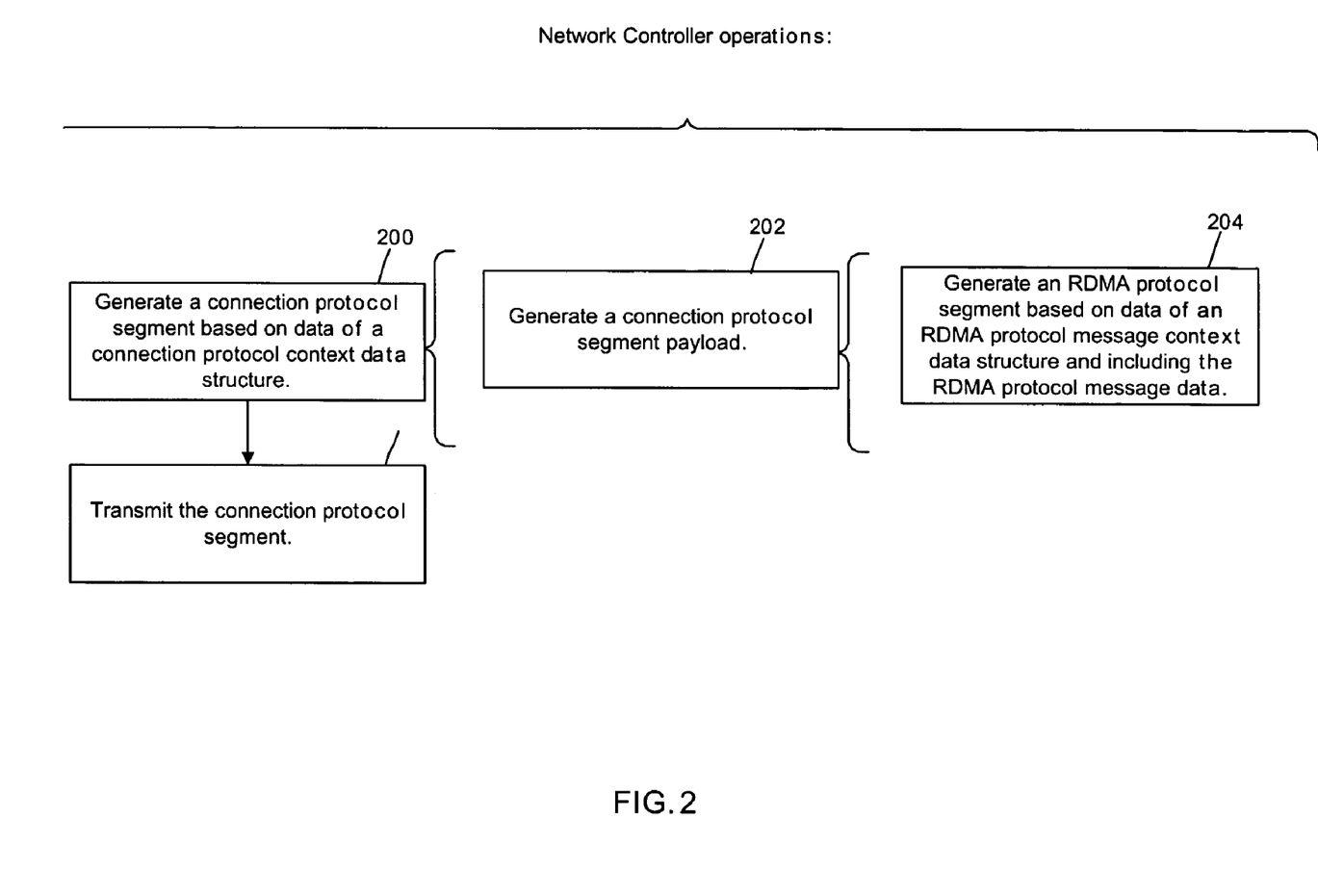
FIG. 2 illustrates one example of operations by a network controller to generate remote direct memory access protocol segments as payloads of a communication protocol segment.

In the illustrated embodiment, the RNIC 114 operates within an RDMA over TCP protocol. It is appreciated that a network controller in accordance with the description provided herein may operate with other remote direct memory access protocols over other communication protocols. For example, FIG. 2 illustrates operations of a network controller which generates (block 200) a connection protocol segment based on data of a connection protocol context data structure. In the embodiment of FIG. 1, the connection protocol is the transport protocol TCP.

In generating the connection protocol segment, the network controller also generates (block 202) the payload of the connection protocol segment. In generating the connection protocol segment payload, the network controller also generates (block 204) a Remote Direct Memory Access (RDMA) protocol segment based upon an RDMA protocol message context data structure. In the illustrated embodiment, RDMA segment is the payload of the connection protocol segment. The RDMA protocol message segment generated by the network controller includes a payload which includes message data which is being transferred in the remote direct memory access.

In the embodiment of FIG. 1, RNIC 114 includes RDMA offload engine 118 for, among other things, organization of TCP segments (including RDMA segments as payloads of TCP segments), to be transmitted via MAC/PHY (medium access control)/(physical layer) 120 on a network communication link 121. Among other types of links, the network communication link 121 may operate according to different physical specifications or network protocols, e.g., the link 121 may operate according to communication standards such as IEEE Std. 802.3 (published Mar. 8, 2002), IEEE Std. 802.11, (published 1999-2003), IEEE Std. 802.16, etc. and be an Ethernet link, a wireless link, etc. implemented with a media such as fiber, unshielded twisted pair, etc.

The TCP segments (including the RDMA segments which are payloads of the TCP segments) are generated based on the information found in various data structures including a data structure referred to herein as an RDMA connection context 122. The RDMA connection context 122 may be used to organize other data structures including data structures referred to herein as RDMA message contexts 124 that contain RDMA message data location information for generating RDMA segments as payloads for different TCP segments that are to be transmitted. This connection and message data location information of these data structures may facilitate RDMA offload engine 118 creation of segments which may include in addition to the RDMA message data, many different headers for packet transmissions such as RDMA headers, TCP header, IP header, and Ethernet header, as well as other components of an RDMA message segment such as markers, pad bytes, CRC, etc.

As described in more detail below, the RNIC 114 may also include a Direct Memory Access (DMA) engine 126 for the direct memory transfers of RDMA message data from host memory 110 to the network communication link to avoid store and forward operations. Each RDMA message context 124 may include information such as the length of the message to be transmitted and the locations or addresses of memory fragments 112 that make up the message buffer. Depending upon the particular RDMA operation, information describing the location of the relevant memory fragments 112 in the host system memory 110 that make up a message buffer may be passed to the RDMA offload engine 118 by the host processor 102 or by a remote RDMA operation initiator. The message buffer may be used by the RDMA offload engine 118 until the entire message buffer is successfully delivered on the network. The host processor 102 may ensure that the message buffer resides in the host system memory 110 at the location described in the message contexts 124 until the message buffer is transmitted and acknowledged as directed by the RDMA message contexts 124 of the RNIC 114. In turn, each RDMA message is transmitted via TCP in the form of one or more RDMA message segments, each of which is a payload of a TCP segment. The RDMA header of each RDMA message segment is formed based on information found in the associated RDMA message context 124. The TCP header of each TCP segment which includes an RDMA message segment as payload, is formed based on information found in the RDMA connection context 122. The TCP segment payload which is an RDMA message segment, is generated by the RDMA offload engine 118. The payload of each RDMA message segment is likewise generated by the RDMA offload engine 118 which accesses the RDMA message data from memory fragments 112 of the host memory 110 in a DMA transaction based on location or address information stored in one or more of the message contexts 124.

In other words, during the transmission from the RNIC 114, the headers of the TCP and RDMA segments are formed from the RDMA connection context 122 and the TCP and RDMA segments receive message segment data for their payloads via DMA from the host system memory 110 to the network communication link based on information found in the message contexts 124 (e.g., cut-through transmissions). Thus, copying of the TCP and RDMA segment payloads to a RNIC 114 may be avoided with the RDMA offload engine 118 because the message segment data for the payloads remain in host system memory 110 until transmission of the TCP segment, that is, during TCP transmissions/retransmissions, the information stored in the message contexts 124 is used to allow the RDMA message segment data for the TCP payloads to remain in host memory 110 until transmission/retransmission of the TCP segment.

For each offloaded RDMA over TCP connection, the RDMA offload engine 118 may maintain a virtual transmit buffer that is described by a linked list of the message contexts 124. For example, during the transmission of a TCP segment, the RDMA offload engine 118 may prepare RDMA, TCP, IP, Ethernet, etc. headers of the TCP segment from the RDMA connection context 122 and the associated RDMA message contexts 124. In the formation of the RDMA message segment which is the payload of the TCP segment, the RDMA offload engine 118 DMAes RDMA message segment data from the host memory 110 based on the buffer address information contained in RDMA message context 124. With generated headers and payloads, the TCP segment may be transmitted on the network communication link 121.

Upon receiving a TCP acknowledgement (ACK) acknowledging the successful transmission of the TCP segments with the RDMA message data described by the relevant message contexts 124, the RDMA offload engine 118 may complete the transmission of the RDMA messages by reporting the message completions to the host stack of the host processor 102. The RDMA connection context 122 containing the TCP connection state may be maintained by the RDMA offload engine 118 for the offloaded connection.

Figure 3:
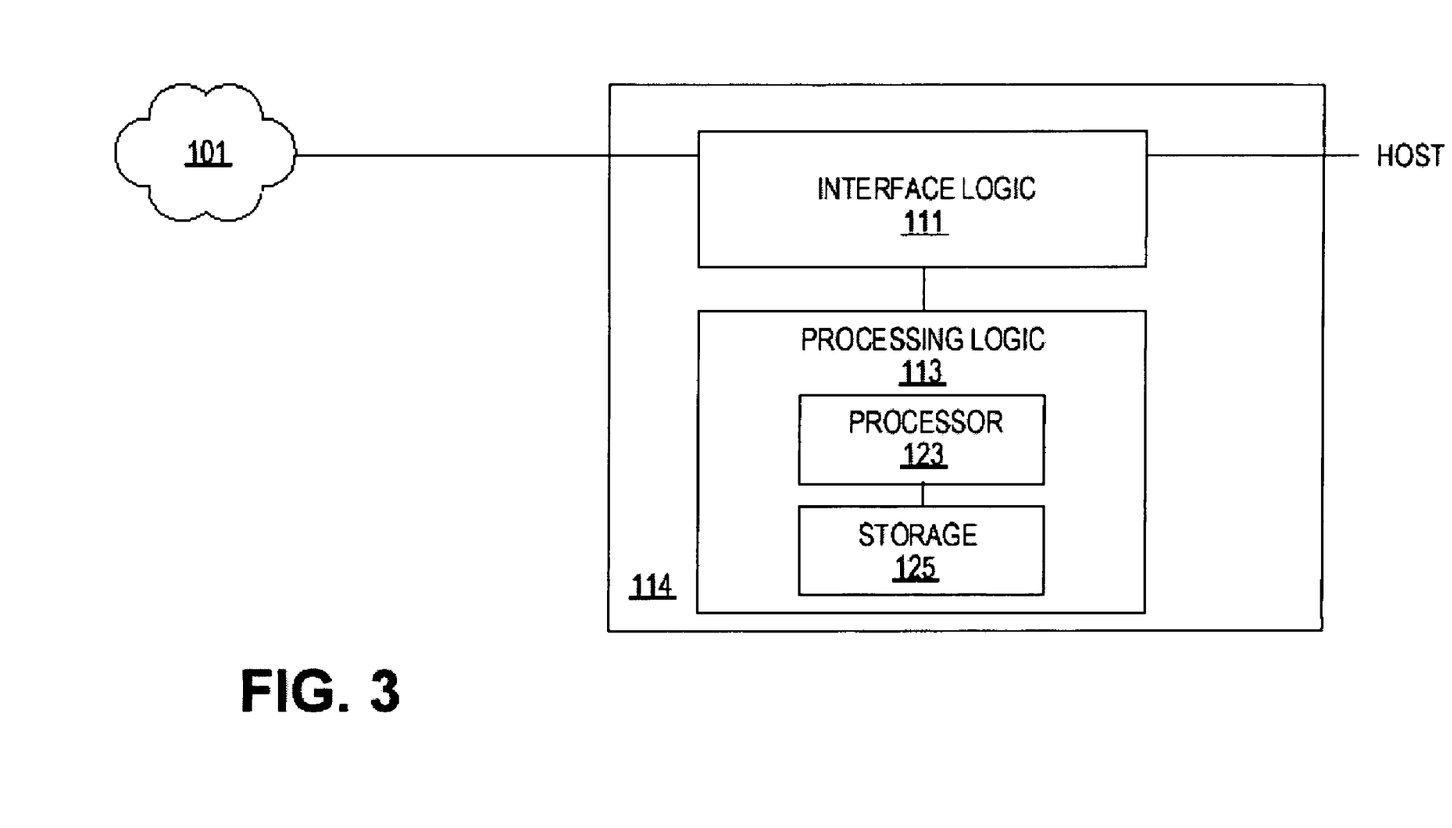
FIG. 3 illustrates other aspects of a network controller according to an embodiment of the system of FIG. 1.

FIG. 3 illustrates other aspects of the RNIC 114. Although many computer systems feature processors that handle a wide variety of tasks, as described above, the RNIC 114 may have the responsibility of handling network traffic. RNIC 114 may perform network protocol operations for a host to at least partially reduce the burden of network communication on a host processor. As stated earlier, the RNIC 114 may perform operations for a wide variety of protocols. For example, the RNIC 114 may be configured to perform operations for transport layer protocols (e.g., TCP and User Datagram Protocol (UDP)), network layer protocols (e.g., IP), and application layer protocols (e.g., sockets programming).

In addition to conserving host processor resources by handling protocol operations, the RNIC 114 may provide "wirespeed" processing, even for very fast connections such as 10-gigabit per second connections. In other words, the RNIC 114 may, generally, complete processing of one packet before another arrives. By keeping pace with a high-speed connection, the RNIC 114 can potentially avoid or reduce the cost and complexity associated with queuing large volumes of backlogged packets.

The example RNIC 114 shown may include an interface 111 for transmitting data traveling between one or more hosts and a network 101. The RNIC 114 interface 111 transmits data from the host(s) and generates packets for network transmission, for example, via a PHY and MAC device (see MAC/PHY 120 from FIG. 1) offering a network connection (e.g., an Ethernet or wireless connection).

In addition to the interface 111, the RNIC 114 also includes processing logic 113 that implements protocol operations. Like the interface 111, the logic 113 may be designed using a wide variety of techniques. For example, the RNIC 114 may be designed as a hard-wired ASIC (Application Specific Integrated Circuit), a FPGA (Field Programmable Gate Array), and/or as another combination of digital logic gates.

As shown, the logic 113 may also be implemented by a RNIC 114 that includes a processor 123 (e.g., a micro-controller or micro-processor) and storage 125 (e.g., ROM (Read-Only Memory) or RAM (Random Access Memory)) for instructions that the processor 123 can execute to perform network protocol operations. The instruction-based RNIC 114 offers a high degree of flexibility. For example, as a network protocol undergoes changes or is replaced, the RNIC 114 can be updated by replacing the instructions instead of replacing the RNIC 114 itself. For example, a host may update the RNIC 114 by loading instructions into storage 125 from external FLASH memory or ROM on the motherboard, for instance, when the host boots.

Though FIG. 3 depicts a single RNIC 114 performing operations for a host, a number of off-load engines 114 may be used to handle network operations for a host to provide a scalable approach to handling increasing traffic. For example, a system may include a collection of engines 114 and logic for allocating connections to different engines 114. To conserve power, such allocation may be performed to reduce the number of engines 114 actively supporting on-going connections at a given time.

In operation, for example, as described herein for the RDMA over TCP protocol, communication or connection information known as RDMA over TCP data (see RDMA connection context 122) may be processed for a given network connection. For a given packet, the RNIC 114 looks-up the corresponding RDMA connection context 122 in the memory and makes this connection information available to the processor 123, e.g., via a working register (not shown). Using connection context data, the processor 123 executes an appropriate set of protocol implementation instructions from storage 125. Connection context data, potentially modified by the processor 123, may be returned to the appropriate message context 124 for RDMA transmission.

The RNIC 114 may perform protocol operations for the packet, for example, by processor 123 execution of protocol implementation instructions stored in storage 125. The processor 123 may determine the state of the current connection and identify the starting address of instructions for handling this state. The processor 123 then executes the instructions beginning at the starting address. Depending on the instructions, the processor 123 may alter connection context data (e.g., by altering the working register). Again, context data, potentially modified by the processor 123, is returned to the appropriate message context 124.

Figure 4:
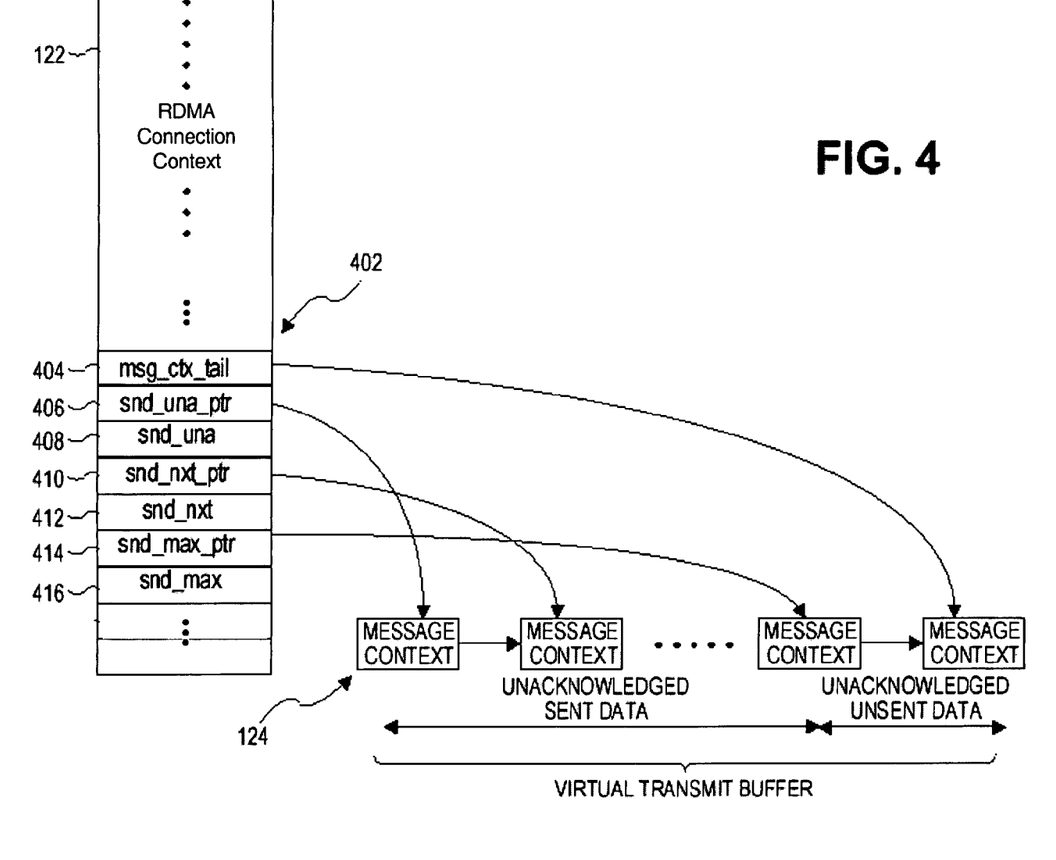
FIG. 4 illustrates an example of variables of a connection context data structure, and their relationship to message contexts according to an embodiment of the system of FIG. 1.

For each RDMA connection, the RNIC 114 maintains a linked list of RDMA message contexts 124. This linked list is managed by the RNIC 114 using the RDMA connection context 122. FIG. 4 illustrates a portion 402 of one example of the fields of the RDMA connection context 122 maintained by the RDMA offload engine 118, and the relationship of these fields 402 to the message contexts 124. The RNIC 114 may maintain the RDMA connection context 122 with a number of fields, a portion of which are illustrated at 402, e.g., msg_ctx_tail 404, snd_una_ptr 406, snd_una 408, snd_nxt_ptr 410, snd_nxt 412, snd_max_ptr 414, and snd_max 416.

The fields 402 of RDMA connection context 122 are maintained by the RDMA offload engine 118 of the RNIC 114 for the TCP transmissions for each RDMA over TCP connection and are described briefly as follows, the pointer fields of FIG. 4 being illustrated with arrows pointing to a respective one of the message contexts 124:

msg_ctx_tail—Pointer to the tail of the linked list of message contexts.

snd_una_ptr—Pointer to the message context that contains the location of the first unacknowledged byte (this is also the head of the linked list of message contexts).

snd_una—Sequence number of the first unacknowledged byte.

snd_nxt_ptr—Pointer to the message context that contains the location of the message segment data for the payload to be sent next (also pointer to the head of the linked list of message contexts).

snd_nxt—Sequence number of the first byte to be sent next.

snd_max_ptr—Pointer to the message context that contains the location of byte with the highest sequence number sent.

snd_max—Highest sequence number sent.

In the illustrated embodiment, for each RDMA message, the RNIC 114 maintains fields including the following fields in a message context 124:

msg_ssn—TCP sequence number associated with the first payload byte of this message context.

msg_esn—TCP sequence number associated with the last payload byte of this message context.

msg_esn_valid—Whether msg_esn is valid or not.

msg_num_sges—Number of SGEs (Scatter Gather Entries (SGE(n)) contained in this message context. SGEs specify a gather list. Each entry specifies a buffer (Steering Tag (STag), Tagged Offset (TO), Length (Len)) which includes a memory fragment 112 in the local system memory 110).

msg_sges[]—Array of SGEs. Each SGE is represented by (STag, TO, length).

msg_rdma_hdr—RDMA (RDMAP/DDP/MPA) template header for the message.

msg_rdma_hdr_size—Size of the template RDMA (RDMAP/DDP/MPA) template header.

msg_len—Length of the message.

msg_bytes_left—Number of message bytes left for TCP transmission/retransmission in this message.

msg_emss—Effective maximum segment size (EMSS) for the message.

msg_base_offset—Base offset for message (for Untagged messages, it is 0 and for Tagged messages, it is equal to base TO).

In the illustrated embodiment, the RNIC 114 includes an RNIC Interface (RI) which supports the RNIC Verb Specification (RDMA Protocol Verbs Specification 1.0, April, 2003) and can be embodied in a combination of one or more of hardware, firmware, and software, including for example, one or more of a network controller driver and the RNIC 114. As previously mentioned, an RDMA Verb is an operation which an RNIC Interface is expected to be able to perform. A Verbs Consumer as represented at 130 (FIG. 1), which may include a combination of one or more of hardware, firmware, and software, may use an RNIC Interface to set up communication to other nodes through RDMA Verbs. RDMA Verbs provide RDMA Verb Consumers the capability to control data placement, eliminate data copy operations, and reduce communications overhead and latencies by allowing one Verbs Consumer to directly place information in the memory of another Verbs Consumer, while preserving operating system and memory protection semantics.

In the illustrated embodiment, the RDMA messages that are generated by the RNIC are:

Send Type (Send, Send with Solicited Event (SE), Send with SE and Invalidate (Inv), Send with Inv.)

RDMA Write

RDMA Read Request

RDMA Read Response

Terminate

It is appreciated that in other applications, other RDMA messages may be generated.

RDMA Read Response is generated by the RNIC 114 in response to a RDMA Read request message received wherein in one embodiment, the host processor 102 is not involved in generating the RDMA Read Response message. The Terminate message is also generated by RNIC 114 and host processor 102 in one application, does not provide any information for that message.

For Send Type, RDMA Write, and RDMA Read Request messages, the host processor 102 provides the following Work Queue Entries (WQEs) from which RNIC generates RDMA messages and associated message contexts 124:

Send WQE:

Scatter Gather Entries (n) (SGE(n)) Steering Tag (STag), Tagged Offset (TO), Length (Len): Scatter Gather Entries (SGE(n)) specify a gather list. Each entry specifies a buffer (Steering Tag (STag), Tagged Offset (TO), Length (Len)) which includes one or more memory fragments 112 in the local system memory 110.

SGE Cnt: Specifies the number of SGEs

Remote STag: Specifies the STag to be invalidated at the remote peer and, in one application, is only meaningful for Send with Invalidate and Send with Solicited Event and Invalidate.

RDMA Write WQE:

SGE(n) STag, Tagged Offset, Length.

SGE Cnt: Specifies the number of valid SGEs, with a maximum of 6 in this embodiment. The valid SGEs start with 1 and are consecutive.

Remote STag, Tagged offset: Specifies a buffer at the remote peer.

RDMA Read WQE:

Local STag, Tagged Offset, Length: Specify a buffer in memory 110 of the local system 100 such as a memory fragment 112.

Remote STag, Tagged Offset: Specify a buffer at the remote peer.

Upon receipt of an a WQE from the host processor 102, a determination is made to as to whether processing the WQE involves generation of an RDMA message. If so, an RDMA Message context 124 is created and the following fields of the RDMA Message context 124 are initialized:

Number of SGEs (message_num_sges)

List of SGEs (message_sges[])

Template header for the RDMA message (msg_rdma_hdr)

Size of template header (msg_rdma_hdr_size)

Message payload length (msg_len)

Message payload bytes left (msg_bytes_left=msg_len)

In addition, the field msg_ctx_tail and the message context list are updated by adding the new message context 124 to the end of the list. In addition, the TCP connection fields snd_na_ptr, snd_nxt_ptr, and snd_max_ptr are updated if appropriate.

When an RDMA Read request is received by the RNIC 114, an RDMA message context 124 is created for the RDMA Read Response. In addition, the following fields of the created RDMA Message context 124 are initialized:

Number of SGEs (msg_num_sges)=1

List of SGEs (msg_sges[]) (One (STag, TO, Len) for RDMA Read Response)

Template header for the RDMA message (msg_rdma_hdr)
Size of template header (msg_rdma_hdr_size)
Message payload length (msg_len)
Message payload bytes left (msg_bytes_left=msg_len)

In addition, the field msg_ctx_tail and the message context list are updated by adding the new message context 124 to the end of the list. In addition, the TCP connection fields snd_una_ptr, snd_nxt_ptr, and snd_max_ptr are updated if appropriate.

Similarly, when a Terminate message is to be generated by the RNIC 114, an RDMA Message context 124 is created by the RNIC 114 and the following fields of the RDMA message context 124 are initialized:
Number of SGEs (msg_num_sges)=0
Template header for the RDMA message (msg_rdma_hdr)
Size of template header (msg_rdma_hdr_size)
Message payload length (msg_len)
Message payload bytes left (msg_bytes_left=msg_len)

In addition, the field msg_ctx_tail and the message context list are updated by adding the new message context 124 to the end of the list. In addition, the TCP connection fields snd_una_ptr, snd_nxt_ptr, and snd_max_ptr are updated if appropriate.

Figure 5:
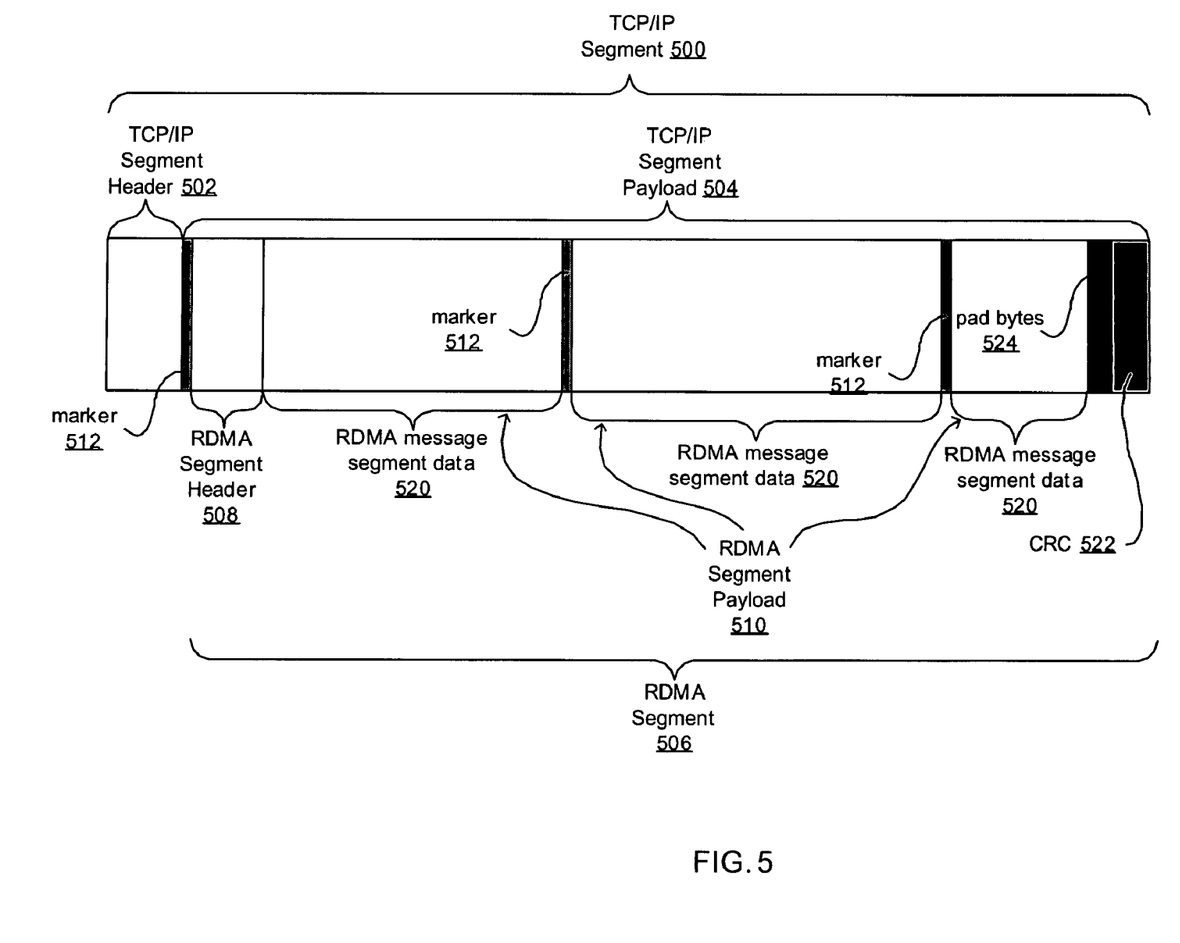
FIG. 5 illustrates an example of an RDMA segment as a payload of a TCP segment.

FIG. 5 illustrates an example of a TCP segment 500 which may be generated by the RNIC 114. The TCP segment 500 has a header 502 and a payload 504 which, in this embodiment, is an RDMA segment 506. The RDMA segment 506 in turn has a header 508 and a payload 510. In this embodiment, the RDMA segment 506 includes markers 512 which are spaced at a predetermined interval as set in a field marker_nterval of the RDMA connection context 122 for the associated RDMA connection in which these segments are being transferred. Another field of the RDMA connection context 122 is the marker_ssn field which identifies the sequence number of the location where the RDMA mode transition happened on this connection, that is, the sequence number of the fist byte of the first maker inserted in this stream.

As previously mentioned, the payload 510 of the RDMA segment 506 comprises message segment data 520 which are transferred from the host memory 110 as the RDMA segment 506 of the TCP segment 500 is being generated by the RNIC 114. After the payload 510 of the RDMA segment 506 is a CRC field 522 which is also generated by the RNIC 114. Pad bytes 524 may be added by the RNIC 114 to the RDMA segment 506 to provide byte alignment of the segment 506 as appropriate, depending upon the particular protocol.

Once an RDMA connection context 122 has been created and initialized for a particular RDMA connection, an RDMA message context 124 has been created and initialized for each RDMA message to be sent over that RDMA connection and the RDMA message contexts 124 for the RDMA connection have been linked into the list supervised by the RDMA connection context 122 for that RDMA connection, the RNIC 114 may generate and transmit TCP segments 500, each of which includes an RDMA segment 506.

Figure 6:
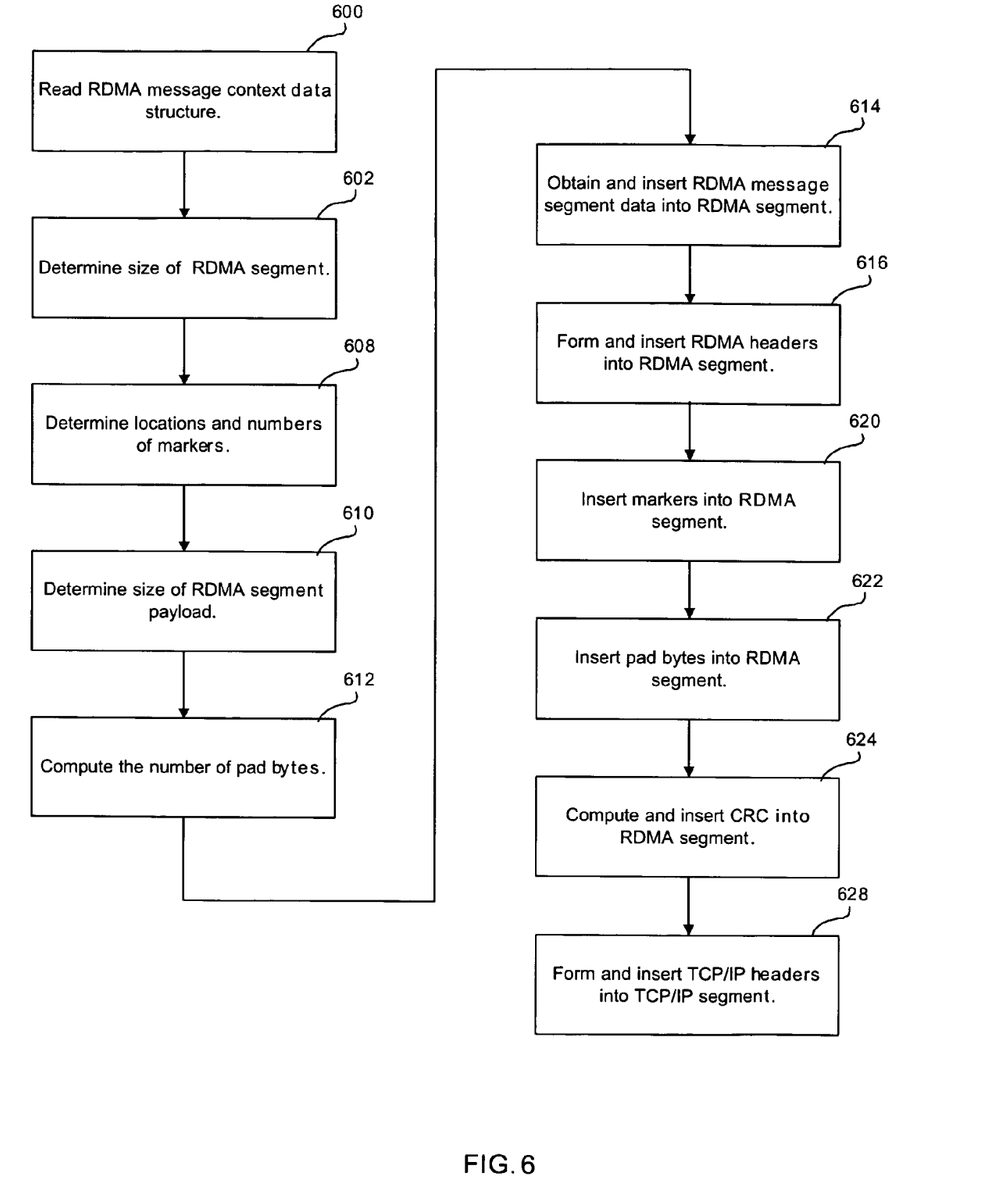
FIG. 6 illustrates another example of operations by a network controller to generate remote direct memory access protocol segments as payloads of a communication protocol segment.

FIG. 6 shows an example of operations of a network controller such as the RNIC 114 to generate "on-the-fly" a protocol segment such as an RDMA over TCP segment 500, for example. The operations of FIG. 6 represent a loop in which one TCP segment 500 may be generated and transmitted (or retransmitted) for a particular message, each time the loop is passed through. It is appreciated that more segments may be transmitted on this TCP connection at a time, depending upon scheduling considerations. Moreover, loops may be operated in parallel to generate segments or portions of segments in parallel.

As previously mentioned, the location of the message segment data to be transmitted is identified by a message context 124. The snd_nxt_ptr field 410 of the connection context 122 points to the particular message context 124 that contains the location of the payload (e.g. message segment data) to be sent next. If the segment 500 has already been transmitted once such that this transmission is a retransmission of a particular segment 500, the snd_nxt_ptr field 410 of the connection context 122 is set to the snd_una_Ptr field 406 which points to the message context that contains the location of the first unacknowledged byte. In addition, other variables appropriate to a TCP transmission or retransmission, including those variables unrelated to a message context based transmission, are set.

In one operation of this loop, the RNIC 114 reads (block 600) an RDMA message context data structure such as an RDMA message context 124 pointed to by the snd_nxt_ptr field 410 of the connection context 122. In another operation, the RNIC 114 determines (block 602) the size of the RDMA segment such as segment 506 to be sent. In the illustrated embodiment, this determination may be made based upon the type of RDMA message and fields of the RDMA message context data 124 including the msg_bytes_left field of which identifies the number of message bytes left for TCP transmission/retransmission of this message, and the msg_emss field which identifies the effective maximum segment size (EMSS) for the message.

If the number of message bytes remaining to be sent equals or exceeds the maximum segment size for an RDMA segment 506, a segment size variable seg_size may be set to the maximum size (that is, full size) with a caveat. The variable seg_size represents the segment size in terms of the maximum number of message bytes to be placed into the RDMA segment 506. (The actual number of message bytes placed into the RDMA segment 506 will be less than the value of the variable seg_size because additional fields will be inserted including the RDMA header 508, CRC field 522 etc.)

As explained below, depending upon the RDMA message type, markers 512 may also be inserted into the RDMA segment 506. In accordance with an RDMA protocol such as the MPA protocol, for example, the markers 512 may be forced into the RDMA segment 506 at a fixed interval. Should such an interval result in a marker being placed at the end of a full size segment 506, the marker location may coincide or overlap with the location of the CRC field 522 at the end of the RDMA segment 506. To avoid such an overlap, the maximum number of the message bytes of the RDMA segment 506 (referred to herein as the variable seg_size) may be reduced appropriately (such as by 4 bytes, for example, assuming a 4 byte marker size). Thus, if it is determined that the byte locations of a marker in accordance with the RDMA protocol overlap byte locations of the RDMA segment 506 reserved for cyclic redundancy check (CRC) bytes in accordance with the RDMA protocol, the maximum number of RDMA message bytes of the RDMA segment 506 (the variable seg_size) may be reduced to eliminate the overlap.

In this embodiment, if the number of message bytes left to be sent is less than the maximum segment size (msg_emss), the value of the variable seg_size may be reduced to equal the remaining number of message bytes. Hence, in this application, message bytes in a TCP segment 500 may be limited to those of one message. In other words, the RDMA message boundaries are preserved at the TCP segment level. It is appreciated that in other applications. a TCP segment 500 may have message bytes from more than one message. In another operation, of this loop a determination (block 604) is made as to the locations and number of markers such as the markers 512 which will be placed in a segment such as the RDMA segment 506. In the illustrated embodiment, this determination may be made based upon the field marker_inerval of the RDMA connection context 122 for the associated RDMA connection, the marker_ssn field which identifies the sequence number of the location where the RDMA mode transition happened on this connection, that is, the sequence number of the fist byte of the first marker inserted in this stream, and the variable seg_size representing the maximum number of message bytes in that particular segment. It is appreciated that the number, size and spacing intervals of markers may vary, depending upon the particular application including the particular protocols being applied. In the example of FIG. 5, the number of markers 512 in the RDMA segment 506 equals 3. In this example, the interval defining the locations of adjacent markers is a fixed quantity of 512 bytes. Also, the last marker placed in the prior segment (not shown) had a byte sequence number which caused the first marker 512 of the illustrated RDMA segment 506 to be placed in the first byte position of the RDMA segment 506. In other segments 506, the numbers and locations of the markers 512 will vary depending upon the sequence number of the last marker in the stream and the size of the particular segment.

In another operation, the size of the RDMA segment payload, which is the number of message segment data bytes in the RDMA segment payload 510, for example, is determined (block 610) by the RNIC 114. In the example of FIG. 5, the RDMA message segment payload comprises three blocks of message segment data 520. In the illustrated embodiment, the RDMA segment payload size is represented by the variable seg_payload_size and may be calculated based upon the size of a marker 512, the number of markers 512 in the segment, the size of the RDMA segment header 508, the length of the CRC field 522, the size of the segment 504, and the number of bytes left from the RDMA message remaining to be transmitted (or retransmitted). For example, the size of the segment 504 may be 1100 bytes, the size of each marker 512 may be 4 bytes per marker, there may be three markers in the particular segment 504 as determined above, the size of the RDMA segment header 508 may be 20 bytes (for an untagged header, for example), and the CRC field 522 may be 4 bytes, for example. If so, the RDMA segment payload size seg_payload_size, may be calculated as 1100 bytes less 12 bytes for the three markers 512, less 20 bytes for the RDMA segment header 508, less 4 bytes for the CRC field 522, leaving, 1068 bytes of message segment data, in this example.

If the number of bytes of message segment data remaining to be transmitted (or retransmitted) is less than 1068 bytes in this example, the RDMA segment payload size seg_payload_size my be set to the remaining number of message segment data bytes to be transmitted/retransmitted. However, in some applications, RDMA segments are to be byte aligned. For example, in some applications, an RDMA segment is to be 4 byte aligned. If the calculated RDMA segment payload size seg_payload_size is not 4 byte aligned, pad bytes may be computed (block 612) and added as appropriate. In this example, the RDMA segment payload size seg_payload_size determined above to be 1068 bytes is divisible by 4 and therefore is already 4 byte aligned. Accordingly, the number of pad bytes 524 in this example is zero. However, if the remaining number of message segment data bytes to be transmitted/retransmitted was less than 1068 bytes, such as 61 bytes, for example, three pad bytes 524 may be added to total 64 bytes (61+3) so that the segment 506 is 4 byte aligned.

Continuing the generation of the RDMA over TCP segment 500, the message segment data such as the message segment data 520 for the RDMA segment payload 510 of the RDMA segment 506, may be obtained (block 614) by the RNIC 114 and inserted into the RDMA segment 506. As previously mentioned, in the illustrated embodiment, the locations of the message segment data for a message are identified by an array of scatter/gather entry fields maintained in a message context 124 by the RNIC 114. The particular message context 124 is in turn identified by appropriate fields of the RDMA message connection context 122.

It is appreciated that the locations of the message segment data may be identified using other techniques. These data locations may be identified by virtual addresses, cache locations or physical addresses. If appropriate, these scatter/gather entries may be translated into physical addresses of the host memory 110 or a cache. An appropriate translation table may be maintained by the RNIC 114 or by another component of the system 100. A cache may be maintained by the RNIC 114 or by another component of the system 100. It is appreciated that the techniques for locating the message segment data will vary, depending upon the particular application.

Once located, the appropriate message segment data may be obtained for insertion into the RDMA segment payload 510 as message segment data 520. The data may be obtained using a variety of techniques, depending upon the particular application. For example, the message segment data may be obtained in a DMA operation between the host memory 110 and the RNIC 114 using the DMA engine 126. In another application, message segment data may be buffered elsewhere including on the RNIC 114 itself.

In another operation, an appropriate RDMA header such as the RDMA segment header 508 may be formed (block 616) and inserted into each RDMA segment 506. In the illustrated embodiment, the format of an appropriate RDMA header is defined by the RDMA over TCP specification and is a function of the particular protocol or protocols selected including protocols such as Marker Protocol Data Unit (PDU) Aligned TCP Framing Protocol (MPA), Direct Data Placement Protocol (DDP); or RDMA Protocol (RDMAP). It is also a function of the manner in which the buffers for the message segment data are identified, such as tagged or untagged. For example, a DDP/MPA header may be formed using the template field msg_rdma_hdr of the message context 124 and adjusting the template header as appropriate. For example, for untagged DDP messages, the Message Offset (MO) field of the DDP/MPA header may be calculated based upon fields of the message context 124 as MO equals the message length (msg_len) less the number of message bytes left to be sent (msg_bytes_left). For tagged DDP messages, the tagged offset (TO) may be calculated based upon fields of the message context 124 as TO equals the message length (msg_len) less the message bytes left to be sent (msg_bytes_left) plus the message base offset (msg_base_offset). As another example, the value of the MPA ULPDU (Upper Layer Protocol Data Unit) length (the data record defined by the layer above MPA) may be calculated as MPA_ULPDU_Length equals the segment payload size (seg_payload_size) plus the size of the RDMA segment header msg_rdma_hdr_size). It is appreciated that the segment header 508 may be formed utilizing a variety of techniques, based upon a variety of protocols, and depending upon the particular application.

Continuing the generation of the RDMA over TCP segment 500, the RNIC 114 inserts (block 620) the markers such as the markers 512, into the RDMA segment such as the RDMA segment 506, at the locations determined above (block 608). In the example of FIG. 5, the markers 512 are three in number, are spaced at the fixed interval of 512 bytes, and the last marker placed in the prior segment (not shown) had a byte sequence number which caused the first marker 512 of the illustrated RDMA segment 506 to be placed in the first byte position of the RDMA segment 506.

In another operation, any pad bytes such as the pad bytes 524 calculated above (block 612) may be inserted (block 622) into the RDMA segment such as the RDMA segment 506, to ensure that the RDMA segment 506 is byte aligned as discussed above. In one example, the RDMA segment payload size seg_payload_size was determined above to be 1068 bytes which is divisible by 4 and therefore is already 4 byte aligned. Accordingly, the number of pad bytes 524 inserted into the segment 506 in this example is zero. However, if the remaining number of message segment data bytes to be transmitted/retransmitted is less than 1068 bytes, such as 61 bytes, for example, three pad bytes 524 may be inserted into the segment 506 after the last message segment data byte of the segment 506 so that the segment 506 is 4 byte aligned.

Continuing the generation of the RDMA over TCP segment 500, the RNIC 114 computes (block 624) the CRC field such as the CRC field 522 and inserts the CRC field into the TCP/IP segment such as the TCP/IP segment 500. It is appreciated that a connection or transport protocol error checking field such as the CRC field 522 may be formed utilizing a variety of techniques, based upon a variety of protocols, and depending upon the particular application.

In another operation, the RNIC 114 forms (block 628) the TCP/IP headers such as the TCP/IP segment header 502, including computation of TCP and IP checksums, and inserts each TCP/IP header into the appropriate TCP/IP segment such as the TCP/IP segment 500. It is appreciated that a connection or transport protocol header such as the header 508 may be formed utilizing a variety of techniques, based upon a variety of protocols, and depending upon the particular application.

In the illustrated embodiment, the TCP/IP segment 500 is transmitted (or retransmitted) by the RNIC 114 upon completion of the generation of the segment 500 by the RNIC 114 including the computation of the CRC field 522. It is appreciated that in some applications, transmission of portions of the TCP/IP segment 500 may be initiated prior to completion of the entire segment.

Although illustrated in FIG. 6 as a series of tasks, it is appreciated that portions of the TCP/IP segment may be generated in parallel. For example, headers may be formed as message segment data is transferred to the RNIC 114. Also, while computing the CRC field 522, markers 512 may be inserted into the segment 500 before the segment 500 is transmitted. Also, the order of operations illustrated in FIG. 6 is provided as an example. It is appreciated that many other orderings of these operations may be suitable. Thus, for example, the operations of blocks 614, 616, 620, 622 can be done in parallel or can be done in any order.

In connection with the transmission of the TCP/IP segment 500, the appropriate fields of the RDMA connection context 122 are updated including the send next pointer (snd_nxt_ptr field 410) to point to the next message context 124 (if all the data of the current message context 124 has been transmitted), the send next (snd_nxt) field 412 which identifies the sequence number of the first byte to be sent next, the send max (snd_max) field 16 which identifies the highest sequence number sent, and the send max pointer (snd_max_ptr) field 414 to point to the current message 124 context if that context contains the location of the byte with the highest sequence number sent.

Upon receipt of an acknowledgment such as a TCP ACK for the data, the RNIC 114 may, if new data is being acknowledged, compute the number of new bytes being acknowledged based upon the sequence number of the first unacknowledged byte as indicated by the snd_una field 408 of the RDMA connection context 122. In addition, the RNIC 114 may compute the number of messages completely acknowledged, starting with the message context 124 that contains the location of the first unacknowledged byte as indicated by the snd_una_ptr field 406 of the RDMA connection context 122. A value representing the number of messages completely acknowledged may be stored in a field num_msgs of the RDMA connection context 122, for example. In addition, the RNIC 114 may free the message contexts 124 which are completely acknowledged by the receipt of this TCP ACK.

Still further, the RNIC 114 may generate message completions as appropriate to indicate to the consumer the completion of transmission of messages as the completions are accomplished. The RNIC 114 may also update the snd_una field 408 which indicates sequence number of the first unacknowledged byte, and update the snd_una_ptr field 406 which points to the message context that contains the location of the first unacknowledged byte. If appropriate, the RNIC 114 may update the msg_ctx_tail field 404 which points to the tail of the linked list of message contexts 124. It is appreciated that segments may be transmitted over a connection or transport protocol utilizing a variety of techniques, based upon a variety of protocols, depending upon the particular application.

In the event that data is not acknowledged and the data is to be retransmitted, the RNIC 114 can completely regenerate each segment 500 which is to be retransmitted, obviating storage of segments awaiting acknowledgement. Thus, FIG. 6 also shows an example of operations of a network controller such as the RNIC 114 to regenerate "on-the-fly" a protocol segment such as an RDMA over TCP segment 500, for example, for retransmission. The operations of FIG. 6 represent a loop in which one TCP segment 500 may be regenerated and retransmitted for a particular message, each time the loop is passed through.

As previously mentioned, the snd_nxt_Ptr field 410 of the connection context 122 points to the particular message context 124 that contains the location of the payload (e.g. message segment data) to be sent next. For a retransmission of a particular segment 500, the snd_nxt_ptr field 410 of the connection context 122 is set to the snd_una_ptr field 406 which points to the message context that contains the location of the first unacknowledged byte. In addition, other variables appropriate to a TCP transmission or retransmission, including those variables unrelated to a message context based transmission, are set. The TCP segment 500 may be regenerated as discussed above and resent until appropriately acknowledged.

In the illustrated embodiment, message data bytes are retransmitted at segment boundaries. As a result, a TCP segment 500 containing both acknowledged message bytes and unacknowledged message bytes may be regenerated and retransmitted in its entirety. It is appreciated that in other embodiments, message data bytes may be retransmitted at other than the originally transmitted segment boundaries. Hence, in such an embodiment, message data bytes may be repackaged into segments having different boundaries from those of the original segments.

Additional Embodiment Details

The described techniques for managing memory may be embodied as a method, apparatus or article of manufacture using standard programming and/or engineering techniques to produce software, firmware, hardware, or any combination thereof. The term "article of manufacture" as used herein refers to code or logic embodied in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are embodied may further be accessible through a transmission media or from a file server over a network. In such cases, the article of manufacture in which the code is embodied may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any suitable information bearing medium.

In certain embodiments, the device driver and network controller embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative embodiments, the network controller embodiments may be included in a system that does not include a storage controller, such as certain hubs and switches.

In certain embodiments, the device driver and network controller embodiments may be embodied in a computer system including a video controller to render information to display on a monitor coupled to the computer system including the device driver and network controller, such as a computer system comprising a desktop, workstation, server, mainframe, laptop, handheld computer, etc. Alternatively, the network controller and device driver embodiments may be embodied in a computing device that does not include a video controller, such as a switch, router, etc.

In certain embodiments, the network controller may be configured to transmit data across a cable connected to a port on the network controller. Alternatively, the network controller embodiments may be configured to transmit data over a wireless network or connection, such as wireless LAN, Bluetooth, etc.

The illustrated logic of FIG. 6 shows certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Details on the TCP protocol are described in "Internet Engineering Task Force (IETF) Request for Comments (RFC) 793," published September 1981, details on the IP protocol are described in "Internet Engineering Task Force (IETF) Request for Comments (RFC) 791, published September 1981, and details on the RDMA protocol are described in the technology specification "Architectural Specifications for RDMA over TCP/IP" Version 1.0 (October 2003). Details on the UDP protocol are described in "Internet Engineering Task Force (IETF) Request for Comments (RFC) 798, published August, 1980, and details on the Fibre Channel are described in "IETF RFC 3643," published December 2003 and the technology specification "Fibre Channel Framing and Signaling Interface", document no. ISO/IEC AWI 14165-25.

Figure 7:
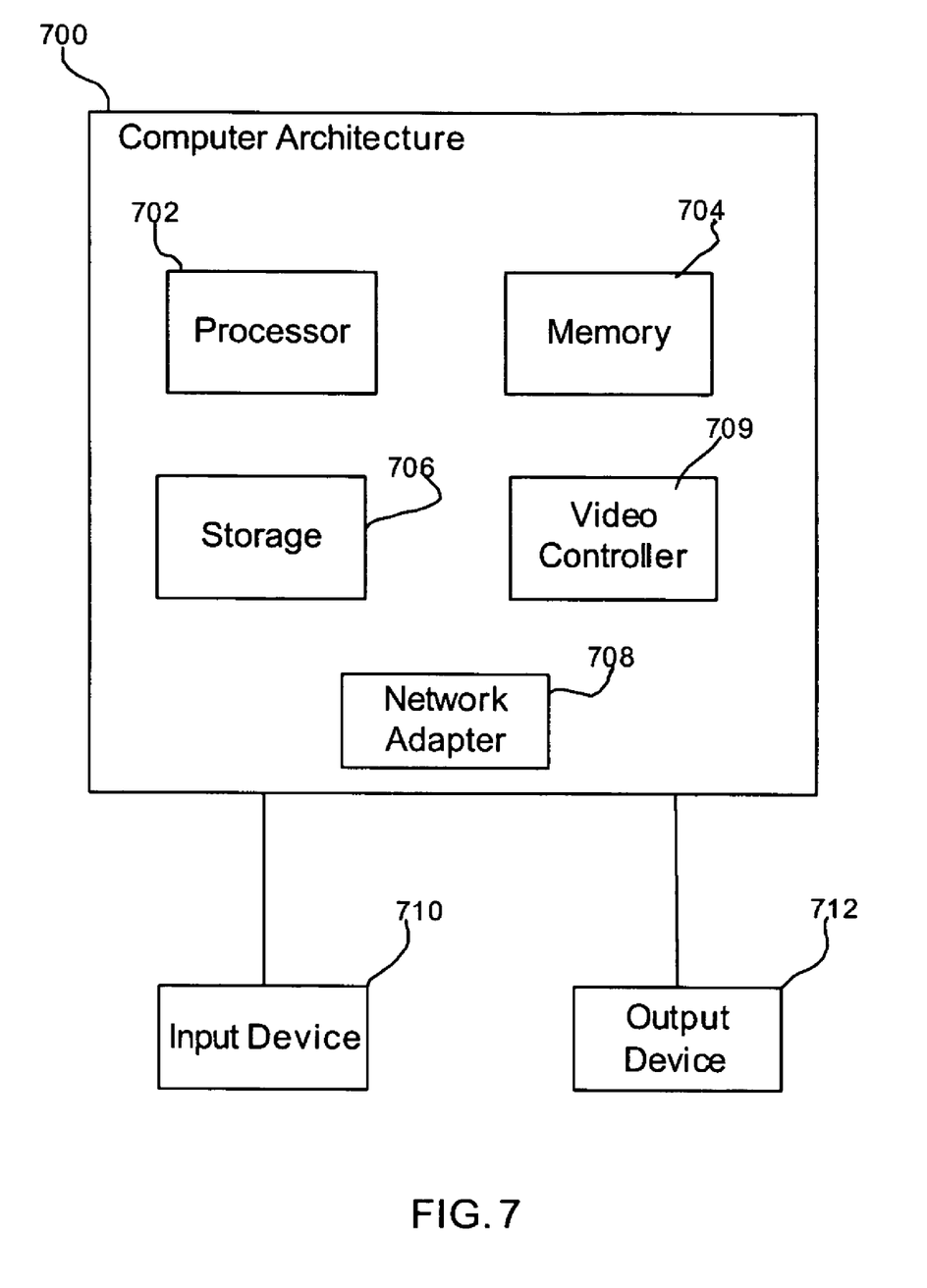
FIG. 7 illustrates an architecture that may be used with the described embodiments.

FIG. 7 illustrates one embodiment of a computer architecture 700 of the network components, such as the hosts and storage devices shown in FIG. 1. The architecture 700 may include a processor 702 (e.g., a microprocessor), a memory 704 (e.g., a volatile memory device), and storage 706 (e.g., a non-volatile storage, such as magnetic disk drives, optical disk drives, a tape drive, etc.). The storage 706 may comprise an internal storage device or an attached or network accessible storage. Programs in the storage 706 are loaded into the memory 704 and executed by the processor 702 in a suitable manner. The architecture further includes a network controller 708 to enable communication with a network, such as an Ethernet, a Fibre Channel Arbitrated Loop, etc. Further, the architecture may, in certain embodiments, include a video controller 709 to render information on a display monitor, where the video controller 709 may be embodied on a video card or integrated on integrated circuit components mounted on the motherboard. As discussed, certain of the network devices may have multiple network cards or controllers. An input device 710 is used to provide user input to the processor 702, and may include a keyboard, mouse, pen-stylus, microphone, touch sensitive display screen, or any other suitable activation or input mechanism. An output device 712 is capable of rendering information transmitted from the processor 702, or other component, such as a display monitor, printer, storage, etc.

The network controller 708 may embodied on a network card, such as a Peripheral Component Interconnect (PCI) card, PCI-express, or some other I/O card, or on integrated circuit components mounted on the motherboard. Any suitable interface, may be used such as any type of PCI bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002), published March 2002), Small Computer System Interface (SCSI) (American National Standards Institute (ANSI) SCSI Controller Commands-2 (SCC-2) NCITS.318: 1998), Serial ATA ((SATA 1.0a Specification, published Feb. 4, 2003), etc or another type of peripheral bus The storage 108 may comprise an internal storage device or an attached or network accessible storage. Programs in the storage 108 are loaded into the memory 106 and executed by the CPU 104. An input device 152 and an output device 154 are connected to the host computer 102. The input device 152 is used to provide user input to the CPU 104 and may be a keyboard, mouse, pen-stylus, microphone, touch sensitive display screen, or any other suitable activation or input mechanism. The output device 154 is capable of rendering information transferred from the CPU 104, or other component, at a display monitor, printer, storage or any other suitable output mechanism.

The foregoing description of various embodiments has been presented for the purposes of illustration and description. It is not intended to be exhaustive or to limit to the precise form disclosed. Many modifications and variations are possible in light of the above teaching.

What is claimed is:

1. A method, comprising:
generating by a network controller, a segment in accordance with a Transmission Control Protocol (TCP) protocol; and
transmitting said TCP segment over a network;
wherein said TCP segment generating includes:
locating and reading a Remote Direct Memory Access (RDMA) connection context data structure in accordance with an RDMA over TCP protocol;
generating for said TCP segment, a TCP header in accordance with said RDMA connection context data structure; and
generating for said TCP segment, a TCP segment payload, said payload generating including generating by said network controller an RDMA message context data structure in accordance with an RDMA protocol, locating RDMA message data, and generating by said network controller, an RDMA message segment based on said RDMA message context data structure and in accordance with the RDMA protocol and including at least a portion of said RDMA message data; wherein said RDMA message segment generating based on said RDMA message context data structure includes:
reading fields of said RDMA message context data structure wherein said fields include a first field identifying the number of bytes of said RDMA message data remaining to be transmitted and a second field identifying a maximum RDMA message segment size;
determining based on said first and second fields, the size of said RDMA message segment; and
determining whether the byte locations of a marker in accordance with said RDMA protocol overlap byte locations of said TCP segment reserved for cyclic redundancy check (CRC) bytes in accordance with a protocol, and if so, reducing a maximum number of RDMA message bytes of said RDMA message segment to eliminate said overlap.

2. The method of claim 1 wherein said RDMA message segment generating based on said RDMA message context data structure includes:
determining the number and byte locations of markers of the RDMA message segment in accordance with the RDMA protocol and based upon a predetermined marker interval in accordance with said RDMA protocol, a byte sequence number of the first byte of the TCP segment containing the RDMA message segment, and the size of said RDMA message segment.

3. The method of claim 2 wherein said generating an RDMA connection context data structure includes:
storing the size of a template RDMA header in a third field of said RDMA message context data structure in accordance with the RDMA protocol; and
wherein said RDMA message segment generating based on said RDMA message context data structure includes:
reading said third field of said RDMA message context data structure; and
determining the size of a payload for said RDMA message segment based on the size of each marker of said markers in accordance with said RDMA protocol, the determined number of markers, the size of the template RDMA header, the length of a CRC field of the TCP segment in accordance with said RDMA protocol, and the number of bytes of said RDMA message data remaining to be transmitted.

4. The method of claim 3 wherein said RDMA message segment generating based on said RDMA message context data structure includes:
determining a number of pad bytes in accordance with the RDMA protocol and wherein said determining a number of pad bytes is based on the size of a payload for said RDMA message segment.

5. The method of claim 4 wherein said locating RDMA message data includes translating location data received by said network controller to physical memory addresses of a host memory and transferring by direct memory access to said network controller, RDMA message data at said physical memory addresses.

6. The method of claim 4 wherein said RDMA message segment generating based on said RDMA message context data structure includes inserting bytes of said located RDMA message data into said RDMA message segment payload.

7. The method of claim 6 wherein said generating an RDMA message context data structure includes storing a template RDMA header in accordance with said RDMA protocol in a fourth field of said RDMA message context data structure; and
wherein said RDMA message segment generating based on said RDMA message context data structure includes generating an RDMA message segment header using said template RDMA header and adjusting said template RDMA header as a function of the number of bytes of RDMA message data in said RMDA message segment payload.

8. The method of claim 7 wherein said RDMA message segment generating based on said RDMA message context data structure includes inserting said markers in said RDMA message segment in accordance with said determined number and byte locations of the markers.

9. The method of claim 8 wherein said RDMA message segment generating based on said RDMA message context data structure includes inserting pad bytes in said RDMA message segment in accordance with said determined number of pad bytes.

10. The method of claim 9 wherein said RDMA message segment generating based on said RDMA message context data structure includes calculating bits for insertion in said CRC field and inserting said calculated bits into said CRC field at the end of said RDMA message segment.

11. The method of claim 10 further comprising:
if a portion of said transmitted TCP segment fails to be successfully acknowledged by a recipient:
regenerating by said network controller, said TCP segment and its payload including said RDMA message segment; and
retransmitting said TCP segment including said RDMA message segment over said network to said recipient.

12. A network controller for use with a network and a host which maintains Remote Direct Memory Access (RDMA) message data, said network controller comprising at least one logic device adapted to:
generate by a network controller, a segment in accordance with a Transmission Control Protocol (TCP) protocol; and
transmit said TCP segment over a network;
wherein said TCP segment generating includes:
locating and reading a Remote Direct Memory Access (RDMA) connection context data structure in accordance with an RDMA over TCP protocol;
generating for said TCP segment, a TCP header in accordance with said RDMA connection context data structure; and generating for said TCP segment, a TCP segment payload, said payload generating including generating by said network controller an RDMA message context data structure in accordance with an RDMA protocol, locating RDMA message data, and generating by said network controller, an RDMA message segment based on said RDMA message context data structure and in accordance with the RDMA protocol and including at least a portion of said RDMA message data;

wherein said RDMA protocol provides for cyclic redundancy check (CRC) bytes and markers in a TCP segment and wherein said at least one logic device is further adapted to:

read fields of said RDMA message context data structure wherein said fields include a first field identifying the number of bytes of said RDMA message data remaining to be transmitted and a second field identifying a maximum RDMA message segment size;

determine based on said fields, the size of said RDMA message segment; and determine whether the byte locations of a marker in accordance with said RDMA protocol overlap byte locations of said TCP segment reserved for cyclic redundancy check (CRC) bytes in accordance with said RDMA protocol, and if so, reduce a maximum number of RDMA message bytes of said RDMA message segment to eliminate said overlap.

13. The network controller of claim 12 wherein said at least one logic device logic device is further adapted to:

determine the number and byte locations of markers of the RDMA message segment in accordance with the RDMA protocol and based upon a predetermined marker interval in accordance with said RDMA protocol, a byte sequence number of the first byte of the TCP segment containing the RDMA message segment, and the size of said RDMA message segment.

14. The network controller of claim 13 wherein said at least one logic device logic device is further adapted to:

store the size of a template RDMA header in a third field of said RDMA message context data structure in accordance with the RDMA protocol;

read said third field of said RDMA message context data structure; and determine the size of a payload for said RDMA message segment based on the size of each marker of said markers in accordance with said RDMA protocol, the determined number of markers, the size of the template RDMA header, the length of a CRC field of the TCP segment in accordance with said RDMA protocol, and the number of bytes of said RDMA message data remaining to be transmitted.

15. The network controller of claim 14 wherein said at least one logic device is further adapted to:

determine a number of pad bytes in accordance with the RDMA protocol and wherein said determining a number of pad bytes is based on the size of the payload for said RDMA message segment so that said RDMA message segment is byte aligned.

16. The network controller of claim 15 wherein said host has a host memory and wherein said at least one logic device is further adapted to translate location data received by said network controller to physical memory addresses of the host memory and to transfer by direct memory access to said network controller, RDMA message data at said physical memory addresses.

17. The network controller of claim 15 wherein said at least one logic device is further adapted to insert bytes of said located RDMA message data into said RDMA message segment payload.

18. The network controller of claim 17 wherein said at least one logic device is further adapted to:

store a template RDMA header in accordance with said RDMA protocol in a fourth field of said RDMA message context data structure; and generate an RDMA message segment header using said template RDMA header and adjust said template RDMA header as a function of the number of bytes of RDMA message data in said RMDA message segment payload.

19. The network controller of claim 18 wherein said at least one logic device is further adapted to insert said markers in said RDMA message segment in accordance with said determined number and byte locations of the markers.

20. The network controller of claim 19 wherein said at least one logic device is further adapted to insert pad bytes in said RDMA message segment in accordance with said determined number of pad bytes.

21. The network controller of claim 20 wherein said at least one logic device is further adapted to calculate bits for insertion in said CRC field and insert said calculated bits into said CRC field at the end of said RDMA message segment.

22. The network controller of claim 21 wherein said at least one logic device is further adapted to:

if a portion of said transmitted TCP segment fails to be successfully acknowledged by a recipient:

regenerate said TCP segment and its payload including said RDMA message segment; and retransmit said TCP segment including said RDMA message segment over said network to said recipient.

23. A system for use with a network, comprising:

a motherboard;

an expansion card coupled to said motherboard;

a host carried on said motherboard, said host being adapted to maintain Remote Direct Memory Access (RDMA) message data;

a network controller carried on said expansion card and comprising at least one logic device adapted to generate a header and a payload for a segment in accordance with a connection protocol, and wherein said at least one logic device is further adapted to:

generate by a network controller, a segment in accordance with a Transmission Control Protocol (TCP) protocol; and transmit said TCP segment over a network;

wherein said TCP segment generating includes:

locating and reading a Remote Direct Memory Access (RDMA) connection context data structure in accordance with an RDMA over TCP protocol;

generating for said TCP segment, a TCP header in accordance with said RDMA connection context data structure; and generating for said TCP segment, a TCP segment payload, said payload generating including generating by said network controller an RDMA message context data structure in accordance with an RDMA protocol, locating RDMA message data, and generating by said network controller, an RDMA message segment based on said RDMA message context data structure and in accordance with the RDMA protocol and including at least a portion of said RDMA message data;

wherein said RDMA protocol provides for cyclic redundancy check (CRC) bytes and markers in a TCP segment and wherein said at least one logic device is further adapted to:

read fields of said RDMA message context data structure wherein said fields include a first field identifying the number of bytes of said RDMA message data remaining to be transmitted and a second field identifying a maximum RDMA message segment size;

determine based on said fields, the size of said RDMA message segment; and determine whether the byte locations of a marker in accordance with said RDMA protocol overlap byte locations of said TCP segment reserved for cyclic redundancy check (CRC) bytes in accordance with said RDMA protocol, and if so, reduce a maximum number of RDMA message bytes of said RDMA message segment to eliminate said overlap.

24. The system of claim 23 wherein said at least one logic device is further adapted to:

determine the number and byte locations of the markers of the RDMA message segment in accordance with the RDMA protocol and based upon a predetermined marker interval in accordance with said RDMA protocol, a byte sequence number of the first byte of the TCP segment containing the RDMA message segment and the size of said RDMA message segment.

25. The system of claim 24 wherein said at least one logic device is further adapted to:

store the size of a template RDMA header in a third field of said RDMA message context data structure in accordance with the RDMA protocol;

read said third field of said RDMA message context data structure; and determine the size of a payload for said RDMA message segment based on the size of each marker of said markers in accordance with said RDMA protocol, the determined number of markers, the size of the template RDMA header, the length of a CRC field of the TCP segment in accordance with said RDMA protocol, and the number of bytes of said RDMA message data remaining to be transmitted.

26. The system of claim 25 wherein said at least one logic device is further adapted to:

determine a number of pad bytes in accordance with the RDMA protocol and wherein said determining a number of pad bytes is based on the size of the payload for said RDMA message segment so that said RDMA message segment is byte aligned.

27. The system of claim 26 wherein said host has a host memory and wherein said at least one logic device is further adapted to translate location data received by said network controller to physical memory addresses of the host memory and to transfer by direct memory access to said network controller, RDMA message data at said physical memory addresses.

28. The system of claim 26 wherein said at least one logic device is further adapted to insert bytes of said located RDMA message data into said RDMA message segment payload.

29. The system of claim 28 wherein said at least one logic device is further adapted to:

store a template RDMA header in accordance with said RDMA protocol in a fourth field of said RDMA message context data structure; and generate an RDMA message segment header using said template RDMA header and adjust said template RDMA header as a function of the number of bytes of RDMA message data in said RMDA message segment payload.

30. The system of claim 29 wherein said at least one logic device is further adapted to insert said markers in said RDMA message segment in accordance with said determined number and byte locations of the markers.

31. The system of claim 30 wherein said at least one logic device is further adapted to insert pad bytes in said RDMA message segment in accordance with said determined number of pad bytes.

32. The system of claim 31 wherein said at least one logic device is further adapted to calculate bits for insertion in said CRC field and insert said calculated bits into said CRC field at the end of said RDMA message segment.

33. The system of claim 32 wherein said at least one logic device is further adapted to:

if a portion of said transmitted TCP segment fails to be successfully acknowledged by a recipient:

regenerate said TCP segment and its payload including said RDMA message segment; and retransmit said TCP segment including said RDMA message segment over said network to said recipient.

34. An article for use with a network controller, a network and a host which maintains Remote Direct Memory Access (RDMA) message data, said article comprising a storage medium, the storage medium having computer readable instructions stored thereon and capable of being executed by a computer to:

generate by a network controller, a segment in accordance with a Transmission Control Protocol (TCP) protocol; and transmit said TCP segment over a network;

wherein said TCP segment generating includes:

locating and reading a Remote Direct Memory Access (RDMA) connection context data structure in accordance with an RDMA over TCP protocol;

generating for said TCP segment, a TCP header in accordance with said RDMA connection context data structure; and generating for said TCP segment, a TCP segment payload, said payload generating including generating by said network controller an RDMA message context data structure in accordance with an RDMA protocol, locating RDMA message data, and generating by said network controller, an RDMA message segment based on said RDMA message context data structure and in accordance with the RDMA protocol and including at least a portion of said RDMA message data;

wherein said RDMA protocol provides for cyclic redundancy check (CRC) bytes and markers in a TCP segment and wherein said storage medium further computer readable instructions stored thereon and capable of being executed by a computer to:

read fields of said RDMA message context data structure wherein said fields include a first field identifying the number of bytes of said RDMA message data remaining to be transmitted and a second field identifying a maximum RDMA message segment size;

determine based on said fields, the size of said RDMA message segment; and determine whether the byte locations of a marker in accordance with said RDMA protocol overlap byte locations of said TCP segment reserved for cyclic redundancy check (CRC) bytes in accordance with said RDMA protocol, and if so, reduce a maximum number of RDMA message bytes of said RDMA message segment to eliminate said overlap.

35. The article of claim 34 wherein said storage medium further has computer readable instructions stored thereon and capable of being executed by a computer to:
determine the number and byte locations of the markers of the RDMA message segment in accordance with the RDMA protocol and based upon a predetermined marker interval in accordance with said RDMA protocol, a byte sequence number of the first byte of the TCP segment containing the RDMA message segment and the size of said RDMA message segment.

36. The article of claim 35 wherein said storage medium further has computer readable instructions stored thereon and capable of being executed by a computer to:
store the size of a template RDMA header in a third field of said RDMA message context data structure in accordance with the RDMA protocol;
read said third field of said RDMA message context data structure; and
determine the size of a payload for said RDMA message segment based on the size of each marker of said markers in accordance with said RDMA protocol, the determined number of markers, the size of the template RDMA header, the length of a CRC field of the TCP segment in accordance with said RDMA protocol, and the number of bytes of said RDMA message data remaining to be transmitted.

37. The article of claim 36 wherein said storage medium further has computer readable instructions stored thereon and capable of being executed by a computer to:
determine a number of pad bytes in accordance with the RDMA protocol and wherein said determining a number of pad bytes is based on the size of a payload for said RDMA message segment so that said RDMA message segment is byte aligned.

38. The article of claim 37 wherein said host has a host memory and wherein said storage medium further has computer readable instructions stored thereon and capable of being executed by a computer to translate location data received by said network controller to physical memory addresses of the host memory and to transfer by direct memory access to said network controller, RDMA message data at said physical memory addresses.

39. The article of claim 37 wherein said storage medium further has computer readable instructions stored thereon and capable of being executed by a computer to insert bytes of said located RDMA message data into said RDMA message segment payload.

40. The article of claim 39 wherein said storage medium further has computer readable instructions stored thereon and capable of being executed by a computer to:
store a template RDMA header in accordance with said RDMA protocol in a fourth field of said RDMA message context data structure; and
generate an RDMA message segment header using said template RDMA header and adjust said template RDMA header as a function of the number of bytes of RDMA message data in said RMDA message segment payload.

41. The article of claim 40 wherein said storage medium further has computer readable instructions stored thereon and capable of being executed by a computer to insert said markers in said RDMA message segment in accordance with said determined number and byte locations of the markers.

42. The article of claim 41 wherein said storage medium further has computer readable instructions stored thereon and capable of being executed by a computer to insert pad bytes in said RDMA message segment in accordance with said determined number of pad bytes.

43. The article of claim 42 wherein said storage medium further has computer readable instructions stored thereon and capable of being executed by a computer to calculate bits for insertion in said CRC field and insert said calculated bits into said CRC field at the end of said RDMA message segment.

44. The article of claim 43 wherein said storage medium further has computer readable instructions stored thereon and capable of being executed by a computer to:
if a portion of said transmitted TCP segment fails to be successfully acknowledged by a recipient:
regenerate said TCP segment and its payload including said RDMA message segment; and
retransmit said TCP segment including said RDMA message segment over said network to said recipient.

* * * * *